(12) United States Patent
Burd

(10) Patent No.: US 10,040,556 B2
(45) Date of Patent: Aug. 7, 2018

(54) CHILLED AIR PLENUM SYSTEM FOR AIRCRAFT GALLEYS

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

(*) Notice: Subject to any disclaimer, the term of this patent is extended or adjusted under 35 U.S.C. 154(b) by 857 days.

(21) Appl. No.: 14/502,470

(22) Filed: Sep. 30, 2014

(65) Prior Publication Data

US 2015/0099446 A1 Apr. 9, 2015

Related U.S. Application Data

(60) Provisional application No. 61/887,633, filed on Oct. 7, 2013.

(51) Int. Cl.
| | |
|---|---|
| *B64D 11/00* | (2006.01) |
| *B64D 11/04* | (2006.01) |
| *B64D 13/08* | (2006.01) |
| *F25D 19/00* | (2006.01) |
| *B64D 13/06* | (2006.01) |

(52) U.S. Cl.
CPC ............. *B64D 11/04* (2013.01); *B64D 13/08* (2013.01); *F25D 19/003* (2013.01); *B64D 2013/0629* (2013.01); *F25D 2317/067* (2013.01)

(58) Field of Classification Search
CPC ....... B62B 3/003; B62B 5/00; B62B 2202/67; B62B 2204/04; B64D 2013/0629; B64D 11/0007; B64D 11/04; B64D 13/08; F24D 2317/063; F24F 19/003

USPC ................ 454/76, 143, 188, 193, 370
See application file for complete search history.

(56) References Cited

U.S. PATENT DOCUMENTS

| | | | |
|---|---|---|---|
| 2,338,382 | A | 1/1944 | Marlow |
| 2,432,587 | A | 12/1947 | Ramsey |
| 2,779,171 | A | 1/1957 | Lindenblad |
| 3,216,215 | A | 11/1965 | Schuett |
| 4,323,110 | A | 4/1982 | Rubbright et al. |
| 4,361,014 | A | 11/1982 | Blain |
| 4,890,463 | A | 1/1990 | Cantoni |

(Continued)

FOREIGN PATENT DOCUMENTS

WO 0055556 A1 9/2000

OTHER PUBLICATIONS

International Search Report, dated Feb. 18, 2015, 4 pages, from PCT/US14/058700, published as WO2015/054009 on Apr. 16, 2015.

*Primary Examiner* — Gregory Huson
*Assistant Examiner* — Dana Tighe
(74) *Attorney, Agent, or Firm* — Donna P. Suchy

(57) ABSTRACT

A chilled air plenum system for aircraft galleys adapted to be connected to a food cart bay for a food cart includes an air return plenum having a return airflow duct with a plurality of midline primary apertures and a plurality of secondary lateral side edge apertures for receiving return airflow from the food cart. The return airflow duct also includes a central lower resilient back stop and lateral side edge resilient back stops to prevent a cart from impacting the rear of the food cart bay. The return air plenum cab be at least partially integrated into a galley back wall structure.

19 Claims, 3 Drawing Sheets

(56) References Cited

U.S. PATENT DOCUMENTS

| | | | |
|---|---|---|---|
| 4,969,509 A * | 11/1990 | Merensky | B64D 13/08 |
| | | | 165/104.34 |
| 5,052,472 A | 10/1991 | Takahashi et al. | |
| 5,265,437 A | 11/1993 | Saperstein et al. | |
| 5,346,127 A | 9/1994 | Creighton | |
| 5,369,960 A | 12/1994 | Mueller et al. | |
| 5,491,979 A | 2/1996 | Kull et al. | |
| 5,496,000 A | 3/1996 | Mueller et al. | |
| 5,513,500 A | 5/1996 | Fischer et al. | |
| 6,014,866 A | 1/2000 | Durham | |
| 7,231,778 B2 | 6/2007 | Rigney et al. | |
| 8,056,349 B2 * | 11/2011 | Oswald | F25D 11/003 |
| | | | 62/186 |
| 8,171,745 B2 * | 5/2012 | Schroder | B64D 13/08 |
| | | | 62/434 |
| 2003/0042361 A1 | 3/2003 | Simadiris et al. | |
| 2005/0140106 A1 * | 6/2005 | Huguet | A47B 95/043 |
| | | | 280/79.3 |
| 2009/0145154 A1 | 6/2009 | Konrad et al. | |
| 2013/0256249 A1 | 10/2013 | Burd | |
| 2013/0260662 A1 | 10/2013 | Burd | |

* cited by examiner

CHILLED AIR PLENUM SYSTEM FOR AIRCRAFT GALLEYS

CROSS-REFERENCES TO RELATED APPLICATIONS

This application is based upon and claims priority from U.S. Application No. 61/887,633, filed Oct. 7, 2013, incorporated by reference in its entirety.

BACKGROUND

This invention relates to transport aircraft galley systems, and more particularly, to systems to cool food carts prior to service by the cabin attendants.

Aircraft galley systems for modern transport aircraft incorporate food carts which are cooled to prevent food spoilage prior to use by the cabin attendants for distribution of food to passengers. These food carts are commonly interfaced with cold air supply systems in the galley designed to cool the interiors of the food carts. Such cool air distribution systems interface with the food carts by means of gaskets connecting the food carts to a plenum providing the cool air. Galley cooling systems are typically mounted in a galley cabinet, so that cool air is discharged from the galley cooling system and circulates over or through galley food carts in a galley cabinet to return to the galley cooling system to again be cooled and discharged. Air through galley food carts typically include grills built into a door of the galley food carts to allow air circulation directly over food inside.

It would be desirable to provide an improved chilled air plenum system for aircraft galleys allowing the installation and chilling by an air chiller of air over type galley food carts within the aircraft galley, having a reduced footprint with a reduced depth of about 35.9 to 36.6 inches, with duct work that can be integrated into a back wall of the galley, and having the ability to chill standard size air over carts in the reduced depth galley. It would also be desirable to provide a chilled air return plenum that extends across the back and around the sides of a galley food cart, to provide an efficient air return path around the cart. It would also be desirable to provide a chilled air return plenum having a duct that incorporates centrally mounted and lateral resilient back stops to prevent the cart from impacting the rear of the galley. The present invention meets these and other needs.

SUMMARY OF THE INVENTION

Briefly and in general terms, the present invention provides for a chilled air plenum system for aircraft galleys adapted to be connected to a chilled galley food cart bay for removably receiving a corresponding aircraft galley food cart at a front portion of the chilled galley food cart bay. The chilled air plenum system allows a standard size cart to be inserted further into a central recess in a return air plenum in the chilled cart bay to provide a reduced foot print air over chilled galley. The chilled air return plenum advantageously extends across a rear portion and lateral sides of the aircraft galley food cart, to provide an efficient air return path around the cart. The chilled air return plenum includes a return air duct having resilient back stops to prevent the aircraft galley food cart from impacting the rear of the galley. The maximum depth for a standard center line galley fitted with air over full size carts can be reduced to 35.9 to 36.6 inches, and the return air plenum can be at least partially integrated into a galley back wall structure.

The present invention accordingly provides for a chilled air plenum system for aircraft galleys adapted to be connected to a chilled galley food cart bay for removably receiving a corresponding aircraft galley food cart at a front portion of the chilled galley food cart bay. The chilled air plenum system includes a galley chiller air return plenum configured to be removably connected to an aircraft galley food cart received in the chilled galley food cart bay. The galley chiller air return plenum includes a return airflow duct configured to be connected to a return airflow duct inlet to a chiller unit, a plurality of primary apertures located along a midline of the return airflow duct and a plurality of secondary apertures located along lateral side edges of the return airflow duct configured to receive return airflow from rear and rear lateral side portions of the aircraft galley food cart. In a presently preferred aspect, the galley chiller air return plenum is configured to be removably connected to the aircraft galley food cart at a rear portion of the chilled galley food cart bay. In another presently preferred aspect, the return airflow duct includes a return airflow duct adapter configured to be connected to the return airflow duct inlet to the chiller unit.

In another presently preferred aspect, the return airflow duct includes a centrally mounted lower back stop located along the midline of the return airflow duct and configured to prevent the cart from impacting the rear portion of the galley food cart bay, and the centrally mounted lower back stop may be mounted on a vacuum formed removable snorkel portion of the return airflow duct. In another presently preferred aspect, the return airflow duct includes a plurality of lateral side edge resilient back stops located along the lateral side edges of the return airflow duct and configured to prevent the cart from impacting the rear of the galley food cart bay. In another presently preferred aspect, the plurality of lateral side edge resilient back stops includes a plurality of upper lateral side edge bump stops, and a plurality of intermediate lateral side edge bump stops.

In another presently preferred aspect, the galley chiller air return plenum includes a plenum body formed from a molded composite or a vacuum formed thermoplastic, for example. In another presently preferred aspect, the return air plenum is at least partially integrated into a galley back wall structure.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
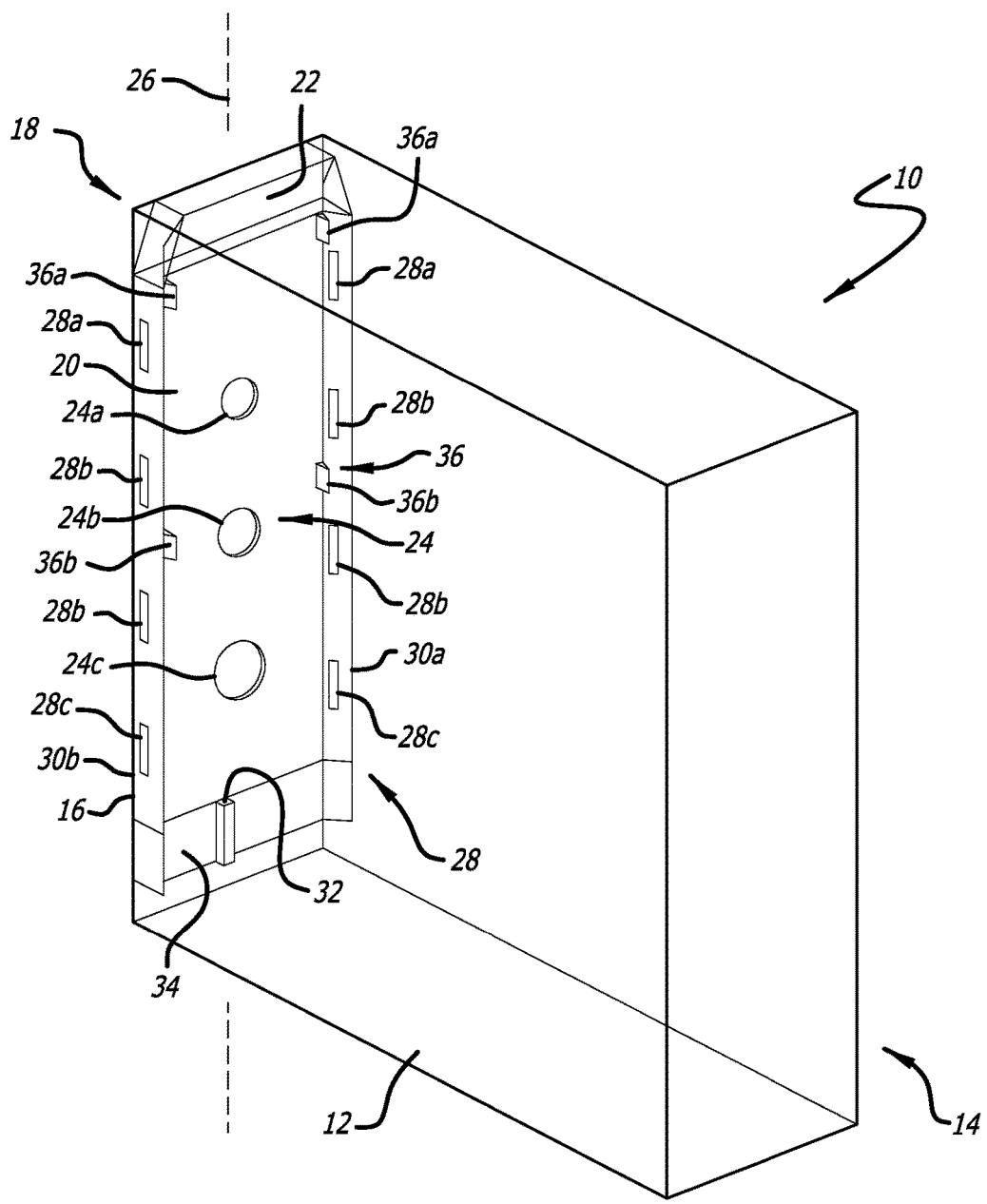
FIG. 1 is a schematic diagram illustrating the chilled air plenum system for aircraft galleys according to the invention.
Figure 2:
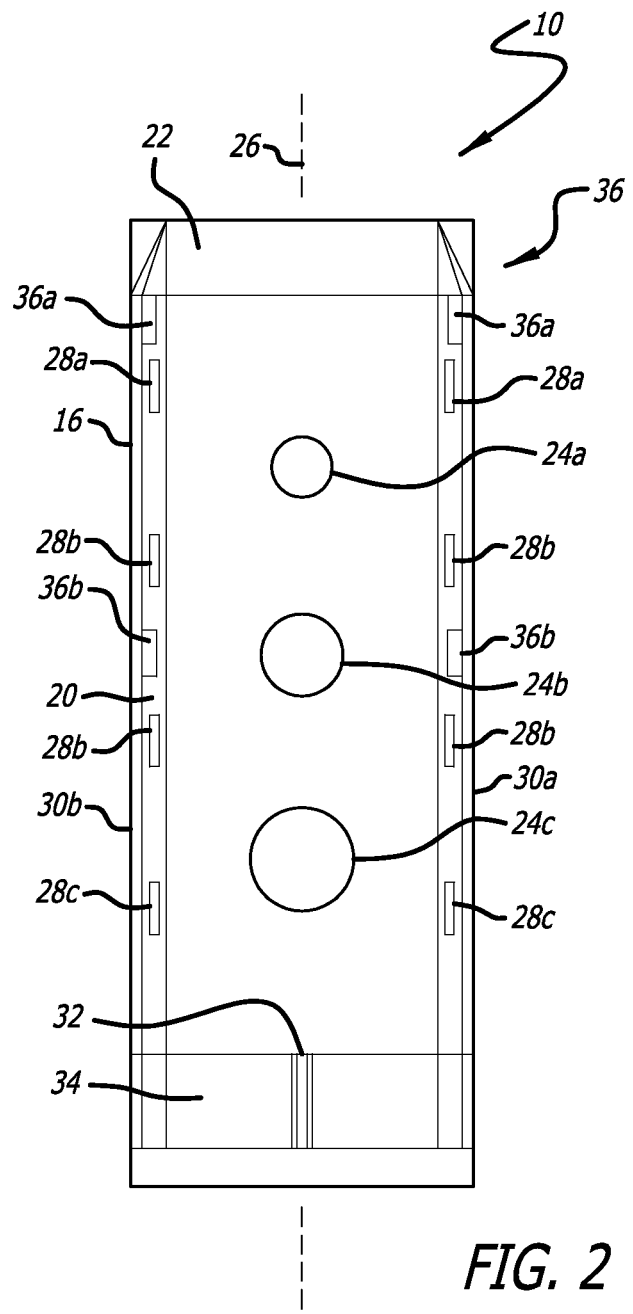
FIG. 2 is a front view of the chilled air plenum system for aircraft galleys of FIG. 1.
Figure 3:
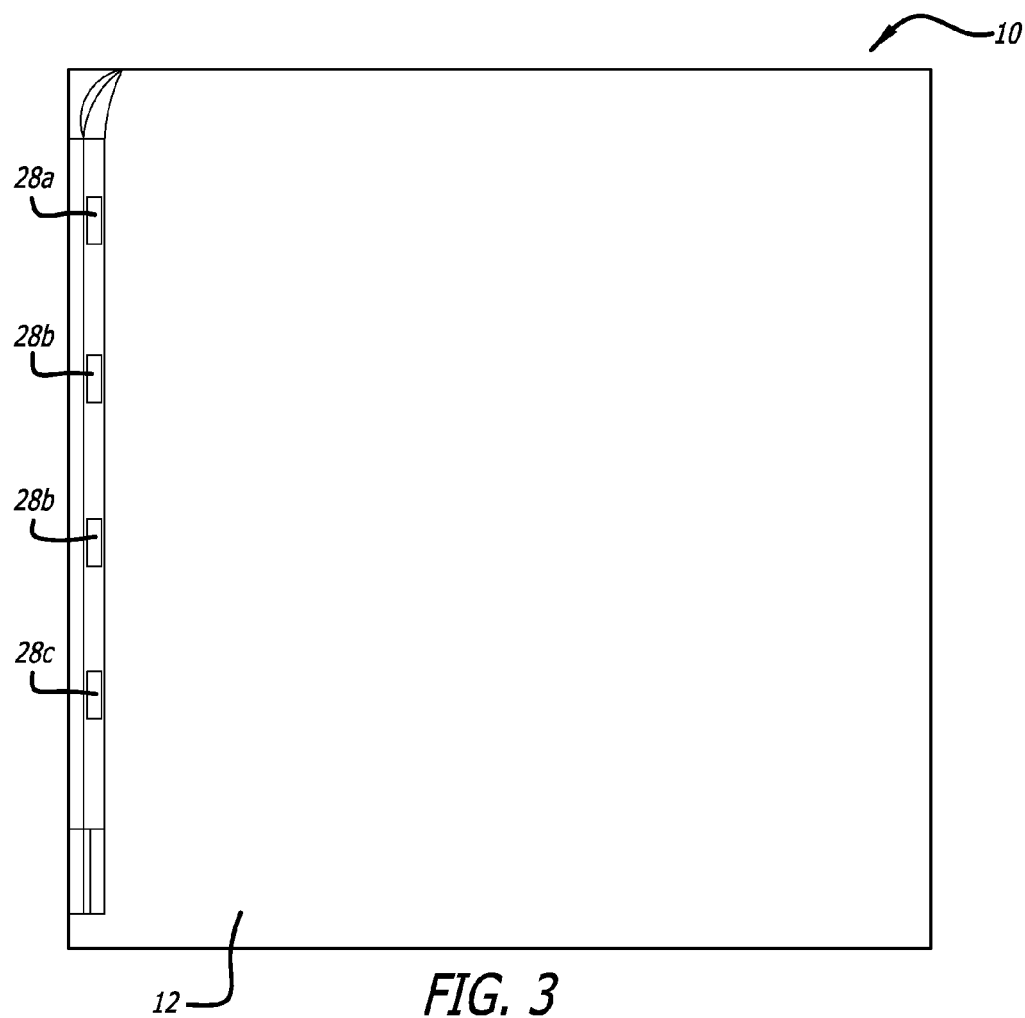
FIG. 3 is a side elevational view of the chilled air plenum system for aircraft galleys of FIG. 1.
Figure 4:
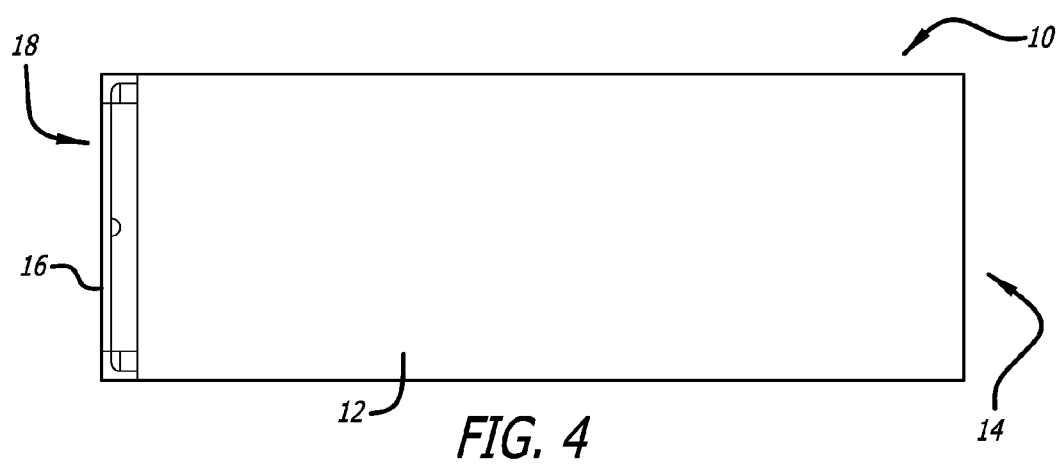
FIG. 4 is a top plan view of the chilled air plenum system for aircraft galleys of FIG. 1.

Referring to the drawings, which are provided by way of example, and not by way of limitation, the present invention provides for a chilled air plenum system 10 for aircraft galleys, includes a chilled galley food cart bay 12 for removably receiving a corresponding aircraft galley food cart (not shown) at a front portion 14 of the chilled galley food cart bay. The chilled air plenum system includes a galley chiller air return plenum 16 connected to said chilled galley food cart bay and configured to be removably connected to an aircraft galley food cart at a rear portion 18 of the chilled galley food cart bay. The plenum body may be made from a molded composite or a vacuum formed thermoplastic, for example.

The galley chiller air return plenum includes a return airflow duct 20 having a return airflow duct adapter or connector 22 configured to be connected to a return airflow duct inlet (not shown) for return of airflow from a galley food cart received in the galley food cart bay to an evaporator of a chiller unit (not shown).

The return airflow duct includes a plurality of primary apertures, slots or holes 24, such as an upper midline primary aperture, slot or hole 24a, an intermediate midline primary aperture, slot or hole 24b, and a lower midline primary aperture, slot or hole 24c, all centrally located along a midline 26 of the return airflow duct and configured to receive return airflow from a rear portion of the aircraft galley food cart. The return airflow duct also advantageously includes a plurality of secondary apertures, slots or holes 28, such as upper lateral side edge secondary apertures, slots or holes 28a, intermediate or middle lateral side edge secondary apertures, slots or holes 28b, and lower lateral side edge secondary apertures, slots or holes 28c, all located along the lateral side edges 30a, 30b of the return airflow duct and configured to receive return airflow from lateral side edges of the rear portion of the aircraft galley food cart, so as to produce a desired airflow pattern around the galley food cart. The return air plenum can be at least partially integrated into a galley back wall structure (not shown).

The return airflow duct also advantageously includes a centrally mounted lower back stop 32 located along the midline of the return airflow duct and configured to prevent the cart from impacting the rear of the galley food cart bay. The centrally mounted lower back stop can be mounted on a vacuum formed removable snorkel portion 34 of the return airflow duct, for example. The return airflow duct also advantageously includes a plurality of lateral resilient back stops 36, such as upper lateral side edge bump stops 36a, and intermediate or middle lateral side edge bump stops 36b, located along the lateral side edges of the return airflow duct and configured to prevent the cart from impacting the rear of the galley food cart bay.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A chilled air plenum for aircraft galleys comprising:
   a return airflow duct having a midline and lateral side edges, said return airflow duct being configured for connection to a return airflow duct inlet configured for connection to a chiller unit;
   a plurality of primary apertures defined in said return airflow duct and located along the midline of the return airflow duct, said plurality of primary apertures being configured to receive return airflow from a rear portion of an aircraft galley food cart; and
   a plurality of secondary apertures defined in said return airflow duct and located in and along the lateral side edges of the return airflow duct, the lateral side edges of the return airflow duct positioned along side edges of a food cart bay of an aircraft galley, said plurality of secondary apertures being configured to receive return airflow from rear lateral side portions of the aircraft galley food cart, wherein, for each of said plurality of secondary apertures, a plane spanning an opening of a given secondary aperture is perpendicular to a plane spanning openings of said plurality of primary apertures;
   wherein the chilled air plenum is configured for removable connection to a rear wall of the food cart bay of the aircraft galley.

2. The chilled air plenum for aircraft galleys of claim 1, wherein said plurality of primary apertures comprises an upper midline primary aperture, an intermediate midline primary aperture, and a lower midline primary aperture, all centrally located along the midline of the return airflow duct.

3. The chilled air plenum for aircraft galleys of claim 1, wherein said plurality of secondary apertures comprises a plurality of upper lateral side edge secondary apertures, a plurality of intermediate lateral side edge secondary apertures, and a plurality of lower lateral side edge secondary apertures, all located along the lateral side edges of the return airflow duct.

4. The chilled air plenum for aircraft galleys of claim 1, wherein said return airflow duct includes a return airflow duct adapter configured for connection to the return airflow duct inlet to the chiller unit.

5. The chilled air plenum for aircraft galleys of claim 1, wherein said return airflow duct includes a centrally mounted lower back stop located along the midline of the return airflow duct and configured to prevent the aircraft galley food cart from impacting the rear portion of the food cart bay.

6. The chilled air plenum for aircraft galleys of claim 5, wherein said centrally mounted lower back stop is mounted on a vacuum formed removable snorkel portion of the return airflow duct.

7. The chilled air plenum for aircraft galleys of claim 1, wherein said return airflow duct includes a plurality of lateral side edge resilient back stops located along the lateral side edges of the return airflow duct and configured to prevent the cart from impacting the rear wall of the food cart bay.

8. The chilled air plenum for aircraft galleys of claim 7, wherein said plurality of lateral side edge resilient back stops comprises upper lateral side edge bump stops.

9. The chilled air plenum for aircraft galleys of claim 7, wherein said plurality of lateral side edge resilient back stops comprises intermediate lateral side edge bump stops.

10. The chilled air plenum for aircraft galleys of claim 1, wherein said return air plenum is at least partially integrated into a galley back wall structure.

11. A chilled air plenum system for aircraft galleys, comprising:
    a chilled galley food cart bay having a front portion and a rear portion, said chilled galley food cart bay being configured to removably receive a corresponding aircraft galley food cart at the front portion of the chilled galley food cart bay;
    a galley chiller air return plenum removably connected to the rear portion of the chilled galley food cart bay, said galley chiller air return plenum including a return airflow duct having a midline and lateral side edges, said return airflow duct being configured to be connected to a return airflow duct inlet to a chiller unit, said return airflow duct comprising
- a plurality of primary apertures located along the midline of the return airflow duct, said plurality of primary apertures being configured to receive return airflow from a rear portion of the aircraft galley food cart, and
- a plurality of secondary apertures located in and along the lateral side edges of the return airflow duct, the lateral side edges of the return airflow duct positioned along side edges of the chilled galley food cart, said plurality of secondary apertures being configured to receive return airflow from rear lateral side portions of the aircraft galley food cart, wherein, for each of said plurality of secondary apertures, a plane spanning an opening of a given secondary aperture is perpendicular to a plane spanning openings of said plurality of primary apertures.

12. The chilled air plenum system for aircraft galleys of claim 11, wherein said plurality of primary apertures comprises an upper midline primary aperture, an intermediate midline primary aperture, and a lower midline primary aperture, all centrally located along the midline of the return airflow duct.

13. The chilled air plenum system for aircraft galleys of claim 11, wherein said plurality of secondary apertures comprises a plurality of upper lateral side edge secondary apertures, a plurality of intermediate lateral side edge secondary apertures, and a plurality of lower lateral side edge secondary apertures, all located along the lateral side edges of the return airflow duet.

14. The chilled air plenum system for aircraft galleys of claim 11, wherein said galley chiller air return plenum is configured to be removably connected to the rear portion of the chilled galley food cart bay.

15. The chilled air plenum system for aircraft galleys of claim 11, wherein said return airflow duct includes a return airflow duct adapter configured to be connected to the return airflow duct inlet to the chiller unit.

16. The chilled air plenum system for aircraft galleys of claim 11, wherein said return airflow duct includes a centrally mounted lower back stop located along the midline of the return airflow duct and a plurality of lateral side edge resilient back stops located along the lateral side edges of the return airflow duct and configured to prevent the aircraft galley food cart from impacting the rear portion of the galley food cart bay.

17. The chilled air plenum system for aircraft galleys of claim 16, wherein said centrally mounted lower back stop is mounted on a vacuum formed removable snorkel portion of the return airflow duct.

18. The chilled air plenum system for aircraft galleys of claim 16, wherein said plurality of lateral side edge resilient back stops comprises a plurality of upper lateral side edge bump stops, and a plurality of intermediate lateral side edge bump stops.

19. The chilled air plenum system for aircraft galleys of claim 11, wherein said return air plenum is at least partially integrated into a galley back wall structure.

* * * * *